(12) United States Patent
Schuster

(10) Patent No.: US 9,186,840 B2
(45) Date of Patent: Nov. 17, 2015

(54) HOLDING RING FOR A BLOW MOULD FOR LOCKING AND FIXING A PLASTICS MATERIAL PRE-FORM

(71) Applicant: KRONES AG, Neutraubling (DE)

(72) Inventor: Gerhard Schuster, Pfakofen (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 14/311,748

(22) Filed: Jun. 23, 2014

(65) Prior Publication Data

US 2014/0377400 A1    Dec. 25, 2014

(30) Foreign Application Priority Data

Jun. 21, 2013   (DE) .......................... 10 2013 106 481

(51) Int. Cl.
| | | |
|---|---|---|
| *B29C 49/42* | (2006.01) | |
| *B29C 49/48* | (2006.01) | |
| *B29C 49/06* | (2006.01) | |

(52) U.S. Cl.
CPC .............. *B29C 49/4205* (2013.01); *B29C 49/48* (2013.01); *B29C 49/06* (2013.01); *B29C 2049/4226* (2013.01); *B29C 2049/4887* (2013.01)

(58) Field of Classification Search
CPC .............. B29C 49/4205; B29C 49/421; B29C 2049/4226; B29C 2049/4882; B29C 2049/4887; B29C 49/48
See application file for complete search history.

(56) References Cited

U.S. PATENT DOCUMENTS

| | | | | |
|---|---|---|---|---|
| 4,212,841 | A * | 7/1980 | Michel .......................... | 264/530 |
| 4,889,247 | A * | 12/1989 | Collette et al. .................. | 215/42 |
| 6,179,143 | B1 * | 1/2001 | Grob .............................. | 215/398 |
| 7,905,719 | B2 | 3/2011 | Lappe et al. ................... | 425/522 |
| 8,021,596 | B2 | 9/2011 | Yoshiike et al. ............... | 264/537 |
| 2010/0140838 | A1 | 6/2010 | Kelley et al. .................. | 264/268 |

FOREIGN PATENT DOCUMENTS

| | | | | |
|---|---|---|---|---|
| DE | 2926044 | 1/1981 | ............. | B29D 23/03 |
| DE | 10063553 | 2/2005 | ............. | B29C 49/26 |
| DE | 102006026885 | 1/2007 | ............. | B29C 49/64 |
| DE | 202007002873 | 5/2007 | ............. | B29C 49/48 |
| DE | 102009056556 | 6/2011 | ............. | B29C 33/04 |
| WO | WO2012131039 | 10/2012 | ............. | B29C 49/48 |

OTHER PUBLICATIONS

German Search Report issued in corresponding application No. 10 2013 106 481.7, dated Dec. 17, 2013 (5 pgs).
Extended European Search Report (w/o translation) issued in related application No. 14173500.1, dated Nov. 18, 2014 (6 pgs).

\* cited by examiner

*Primary Examiner* — Robert B Davis
(74) *Attorney, Agent, or Firm* — Hayes Soloway P.C.

(57) ABSTRACT

The invention relates to a holding ring for a blow mould for locking and fixing a plastics material pre-form, with a support face for supporting a collar of the plastics material pre-form and a receiving cavity extending at a right angle to a main extension plane of the support face for receiving a neck region of the plastics material pre-form, wherein the receiving cavity is widened radially outwards in a conical manner at least locally in the cross-sectional area thereof starting from the support face along a longitudinal direction (L) of the plastics material pre-form.

16 Claims, 1 Drawing Sheet

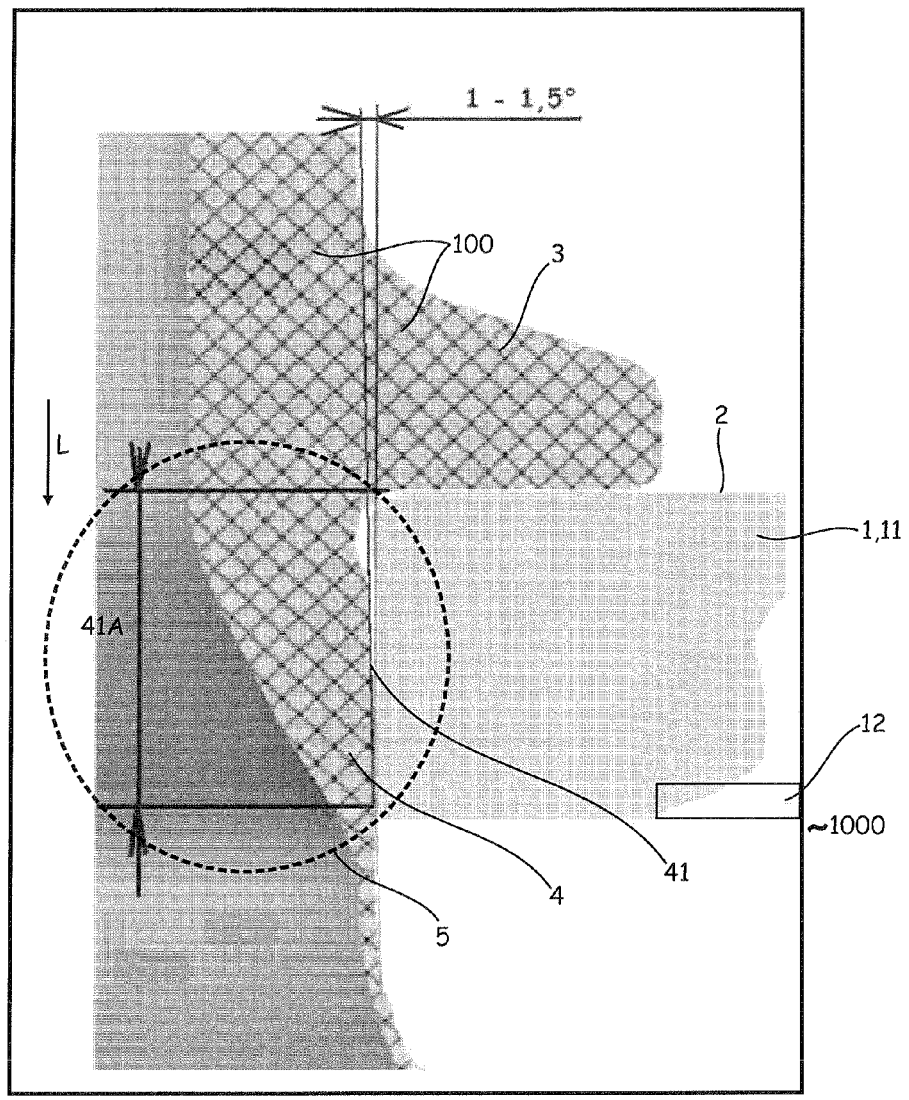

HOLDING RING FOR A BLOW MOULD FOR LOCKING AND FIXING A PLASTICS MATERIAL PRE-FORM

BACKGROUND OF THE INVENTION

The present invention relates to a holding ring for a blow mould for locking and/or fixing a plastics material pre-form with a support face for supporting a collar of the plastics material pre-form and a receiving cavity extending at a right angle to a main extension plane of the support face for receiving a neck region of the plastics material pre-form.

In particular, in the field of the beverage industry, plastic bottles have also been used as well as glass bottles for a considerable time already for the beverages to be poured in. In the production of these plastic bottles it is known to heat a plastics material blank, to supply it to a blow mould and then to blow it to its final size. To this end, use is generally made of blow moulds which are closed on their periphery around the blank to be blowed up and which are then supplied with compressed air through their opening.

In this case the aperture of the prospective bottle is already produced in the blank and it is preferably not treated further. For the actual blow moulding process a peripheral edge or collar of the blank rests upon a peripheral edge of the blow mould, so as to prevent the blank from falling into the interior of the blow mould.

In other words, as soon as a blow mould of this type is closed, the blank, i.e. the so-called pre-form, rests on the support face of the holding ring directly before the stretch blow moulding process.

In the shaping of the plastics material pre-form into the bottle, in particular two regions of the plastics material pre-form play a decisive role during the blow moulding procedure. On the one hand, a first region above the carrying ring is essential since this region may not change or scarcely change if possible. On the other hand, a second region below the holding ring should be defined which, starting from a "test-tube-shaped" body shape of the plastics material pre-form has to be reshaped into the bottle shape. During the blow moulding process an inner face of the plastics material pre-form is increased by a multiple, for example by a factor of twenty. At the same time a wall thickness decreases accordingly, for example by the same factor. This does not, however, take place to the same degree at all points on the plastics material pre-form. The region directly below the holding ring, i.e. below the collar, undergoes these stresses to the shortest degree. At this transition region a mouldability may occur which can be controlled only with difficulty and which increases (relax process without cooling of the neck plate) or reduces (normal re-shrinkage and optionally further components) a start of a bottle neck, for example in diameter in part.

Holding rings from the prior art for a blow mould, which are used for example during a blow moulding process, have the drawback, however, that a starting region of a neck directly below the collar of the plastics material pre-form changes in an undesired manner for example away from the collar in the direction of a longitudinal axis of the plastics material pre-form and undesired thickened portions of material can occur for example, as a result of which available neck handling systems cannot reliably convey the plastics material pre-forms or containers formed from them. In addition, an undesired higher weight of the plastics material pre-form can occur.

The object of the present invention is therefore to eliminate or at least to reduce the risk of undesired thickened portions of material in the neck region of a plastics material pre-form and at the same time to improve the manipulation of the plastics material pre-forms during and after the blow moulding.

SUMMARY OF THE INVENTION

In order to provide a holding ring for a blow mould for locking and/or fixing a plastics material pre-form, by which undesired thickened portions of material inside a neck region below a collar of the plastics material pre-form are prevented on the one hand and by which plastics material pre-forms are capable of being manipulated in a particularly reliable manner, the present invention inter alia makes use of the idea that the receiving cavity is widened radially outwards in a conical manner at least locally in the cross-sectional area thereof starting from the support face along a longitudinal direction of the plastics material pre-form.

The conical widening ensures that, in particular, although a bottle cooling after and/or during the shaping out is constricted to a greater degree in the neck region, for example at a lower end of the neck region than at an upper end, different cooling properties in this respect lead in the worst case to such a neck region being made cylindrical. In the ideal case, however, the receiving cavity formed "in a conical manner" ensures that even after the cooling the bottle produced from the plastics material pre-form is in its cross-section still more stable and capable of being better manipulated by the holding ring on account of the bottle neck extending outwards in a conical manner, since contact points of the holding ring in conjunction with the bottle neck widening outwards in a conical manner lead to the bottle giving way downwards in the longitudinal direction, as a result of which the plastics material pre-form and/or the bottle is or are automatically pressed into the blow mould or some other holding device by means of such a "conical" design of the bottle neck.

In addition, such a conical design of the receiving cavity, for example on a blow mould, allows a widening of a process window for example in terms of time, when forming a bottle in such a way that during the blow moulding procedure more material can be drawn out of the neck. In addition, on account of this "easier drawing" of the plastics material pre-form, which is formed with a PET material for example, in the neck region an improvement during the filling, i.e. making easier and shortening the process time, is made possible.

According to at least one embodiment the holding ring for a blow mould for locking and fixing a plastics material pre-form comprises a support face for supporting a collar of the plastics material pre-form and a receiving cavity extending at a right angle to a main extension plane of the support face for receiving the neck region of the plastics material pre-form. In this case the receiving cavity is widened radially outwards in a conical manner at least locally in the cross-sectional area thereof starting from the support face along a longitudinal direction of the plastics material pre-form. In particular, it is possible for the support face to be widened radially outwards completely and throughout in the manner of a cone. In this respect the support face can be seen as an imaginary frustum with a cross-section widening towards the outside.

According to at least one embodiment an inclination of an inner face of the receiving cavity with respect to the longitudinal direction amounts to at least 0.5° and at most 10°, preferably at least 1° and at most 6°, and in a particularly preferred manner at least 1° and at most 3°. It has surprisingly been learned that a narrow minimal deviation in this way from the longitudinal direction on the one hand ensures that the plastics material pre-form neither has undesired thickened portions of material nor is difficult to manipulate, and, in addition, the inclination of the inner face with respect to the longitudinal direction is not so large that the bottle neck widens too quickly or a manipulation of the holding ring would be made unnecessarily difficult.

According to at least one embodiment a projection of an extension of an inner face of the receiving cavity on the longitudinal direction is at most 10 mm, preferably at most 8 mm, and in a particularly preferred manner at most 6 mm. In this context "projection" means a mathematically imagined image of the inner face of the receiving cavity in a direction at a right angle to the longitudinal direction of the plastics material pre-form on the longitudinal direction. It has in fact been found that a limit to the width of the holding ring in this way in the longitudinal direction is already entirely sufficient for the desired effects, in particular with respect to an easier neck handling as well as the prevention of undesired thickened portions of material, to be able to be achieved without the holding ring having to be made excessively wide.

An extension of such a dimension has been chosen inter alia since it is intended to prevent the holding ring on the plastics material pre-form from extending into the blow mould, for example to a length of more than ten millimeters in total (thickness of the neck centering plate plus the thickness of the holding ring). The neck centering plate can in fact be a standardized and/or normalized re-usable fitting part in the production process, and it is for example fitted in the standard manner with the same dimensions and is adapted to the necessary geometry of the plastics material pre-forms then.

According to at least one embodiment the holding ring comprises two holding clamp halves which are capable of being tensioned around a neck region below the collar of the plastics material pre-form by means of holding means, these two holding clamp halves forming the receiving cavity in the closed state. By way of example, the holding means can be spring-loaded grippers and/or closing and locking means. Following a closing movement the blow mould is closed and a spring-loaded gripper of this type is then tightened. After the closing, it is possible, as described above, for thickened portions of material and undesired changes in diameter, in particular in the neck region of the plastics material pre-form and later the finished blow moulded bottle, to occur during the blow moulding in the case of holding rings described in the prior art. An inexpensive locking and fixing mechanism of the plastics material pre-form is provided therefore on the one hand in a particularly simple manner before, during and after the blow moulding process by means of the holding clamp halves described here, and at the same time a receiving cavity is formed in a particularly short process time.

According to at least one embodiment the holding ring is designed in the form of a neck centering plate. In this context "in the form of a neck centering plate" means that the holding ring need not necessarily to be identical with a neck centering plate, but only significant features can be present, i.e. in particular the plate-shaped design of the holding ring for centering and/or fixing purposes. It may also be the case, however, that the holding ring is in fact a neck centering plate.

In particular, it is possible for the holding ring to be inserted into a separate neck centering plate. The neck centering plate can be formed from a steel material and can be cooled by means of a coolant (in particular water) for example and an associated cooling apparatus.

In addition, it is possible for the holding ring to be incorporated in the neck centering plate or even in the blow mould (formed from an aluminium material for example). The holding ring and the blow mould can then be made in one piece with each other or can even be assembled in a fixed manner with respect to each other, for example in a detachable manner. In particular, it would also be possible for the conical cross-sectional area widening in the longitudinal direction of the plastics material pre-form and radially outwards to be incorporated directly into the blow mould. In this case it could be possible to dispense with the holding ring and, nevertheless, for a thickened portion of material below the support ring to be avoided.

According to at least one embodiment the holding ring is capable of being arranged flush on the collar of the plastics material pre-form. The term "flush" means that the collar of the plastics material pre-form and the holding ring have formed between them neither a gap nor an interruption which would render blow moulding difficult or at least increase the risk of an insufficiently firm locking of the plastics material pre-form during the blow moulding. A flush design in this way is therefore desirable for a particularly uniform and stable blow moulding of the plastics material pre-forms. A flush arrangement in this way is, in addition, significantly facilitated by way of the receiving cavity which is described here and which widens radially outwards in the manner of a cone, since on account of the conical shape of the receiving cavity the plastics material pre-form would like to give way downwards, for example in the direction of a blow mould base, and in this way a "flush locking" can be set, in particular automatically.

In addition, a blow mould for the production of plastics material containers is disclosed. In this case the blow mould comprises at least one holding ring, as described in conjunction with one or more of the embodiments named above.

This means that the features indicated for the holding ring described here are also disclosed for the blow mould described here and vice versa. In this case the blow mould described can have the same advantages and designs as disclosed in conjunction with the holding ring described here.

BRIEF DESCRIPTION OF THE DRAWINGS

Further advantages and embodiments are evident from the accompanying drawing. In the drawing FIG. 1 is a diagrammatic side view of an embodiment of a holding ring described here as an element of a blow mould described here.

DETAILED DESCRIPTION OF THE DRAWINGS

In the embodiment and the FIGURE, components which are the same or act in the same way are provided with the same reference numbers in each case. The elements illustrated should not be regarded as being to scale, but in fact individual elements can be shown exaggeratedly large for better understanding.

An embodiment of a blow mould 1000 described here comprising an embodiment of a holding ring 1 described here is shown in FIG. 1 with reference to a diagrammatic side view. The holding ring 1 for the blow mould 1000 for locking and fixing a plastics material pre-form 100 has a support face 2 for supporting a collar 3 of the plastics material pre-form 100 and a receiving cavity 4 extending at a right angle to a main extension plane of the support face 2 for receiving a neck region 5 of the plastics material pre-form 100. The holding ring 1 in this case can be a component separate from the blow mould 1000 or, on the other hand, can be designed in a manner integrated in the blow mould 1000. In this case the receiving cavity 4 widens radially outwards in the manner of a cone throughout in its cross-sectional area along a longitudinal direction L of the plastics material pre-form 100 starting from the support face 2. In other words the cross-sectional area widens in a continuous and uniform manner in the longitudinal direction L of the receiving cavity 4. In this case it is evident from FIG. 1 in a particularly clear manner that an inclination of an inner face 41 of the receiving cavity 4 with respect to the longitudinal direction L amounts to at least 0.5° and at most 5°, preferably at least 1° and at most 4°, for example at least 1° and at most 1.5°. Experience has shown, in fact, that, when the holding ring 1 is closed which is formed in the present case by two holding clamp halves 11 (which are fastened to each other by way of holding means 12), any movement of the plastics material pre-form 100 or the already finished blow moulded bottle which occurs during the blow moulding procedure in the blow mould 1000 (caused for example by vibrations, transfers, or lateral forces through nozzles) can lead to the possibility of the bottle and/or the plastics material pre-form 100 giving way downwards and thus resting securely on the blow mould 1000 and for example the holding ring 1 in particular resting flush against the support face 2. Every transfer in a subsequent "gripper from above", for example a transfer star wheel, can then be successfully carried out in a more reliable manner.

In addition, it is clearly shown in FIG. 1 that a projection 41A of an extension of the inner face 41 of the receiving cavity 4 on the longitudinal direction L amounts to at most 10 mm, preferably at most 8 mm, and in a particularly preferred manner at most 5 mm. In this case the holding ring 1 is designed in the form of a neck centering plate in the embodiment, in which case, which is again likewise evident from FIG. 1, the collar 3 of the plastics material pre-form 100 rests flush on the support face 2 for supporting the collar 3.

The conical widening ensures that, in particular, although a bottle cooling after and/or during the shaping out is constricted to a greater degree in the neck region 5, for example at a lower end of the neck region 5 than at an upper end, different cooling properties in this respect lead in the worst case to such a neck region 5 being made cylindrical in a side view. In the ideal case, however, the receiving cavity 4 formed "in a conical manner" ensures that even after the cooling the bottle produced from the plastics material pre-form 100 is in its cross-section still more stable and capable of being better manipulated by the holding ring 1 on account of the bottle neck extending outwards in a conical manner, since contact points of the holding ring 1 in conjunction with the bottle neck widening outwards in a conical manner lead to the bottle and/or the plastics material pre-form 100 giving way downwards in the longitudinal direction, as a result of which the plastics material pre-form 100 and/or the bottle is or are automatically pressed into the blow mould 1000 or some other holding device by means of such a "conical" design of the bottle neck.

In addition, such a conical design of the receiving cavity 4, for example on the blow mould 1000, allows a widening of a process window for example in terms of time, when forming a bottle in such a way that during the blow moulding procedure more material can be drawn out of the neck, and in particular out of the region of the neck region 5. In addition, on account of this "easier drawing" of the plastics material pre-form 100, which is formed with a PET material for example, in the neck region 5 an improvement during the filling, i.e. making easier and shortening the process time, is made possible.

The invention is not restricted by the description with reference to the embodiments, but rather the invention embraces every new feature as well as the combination of features, which covers in particular every combination of features in the claims, even if this feature or this combination itself is not set out explicitly in the claims or the embodiments.

LIST OF REFERENCES 1 holding ring
2 support face
3 collar
4 receiving cavity
5 neck region
11 holding clamp halves
41 inner face
41A projection of the inner face on the longitudinal direction L
100 plastics material pre-form
1000 blow mould
L longitudinal direction

The invention claimed is:

1. A holding ring for a blow mould for locking and/or fixing a plastics material pre-form with a support face for supporting a collar of the plastics material pre-form and a receiving cavity extending at a right angle to a main extension plane of the support face for receiving a neck region of the plastics material pre-form, wherein the receiving cavity is widened radially outwards in a straight wall conical manner at least locally in the cross-sectional area thereof starting from the support face along a longitudinal direction (L) of the plastics material pre-form, wherein an inclination of an inner face of the receiving cavity with respect to the longitudinal direction (L) amounts to at least 0.5° and at most 10°, and wherein a projection of an extension of an inner face of the receiving cavity on the longitudinal direction (L) amounts to at most 10 mm.

2. A holding ring according to claim 1, further comprising two holding clamp halves which are capable of being tensioned around a neck region below the collar of the plastics material pre-form by a holding device, wherein these two holding clamp halves form the receiving cavity in the closed state.

3. A holding ring according to claim 1, wherein it is designed in the form of a neck centering plate.

4. A holding ring according to claim 1, wherein it is capable of being arranged flush on the collar of the plastics material pre-form.

5. A blow mould for the production of plastics material containers, comprising at least one holding ring according to claim 1.

6. A blow mould for the production of plastics material containers, comprising at least one holding ring according to claim 2.

7. A blow mould for the production of plastics material containers, comprising at least one holding ring according to claim 3.

8. A blow mould for the production of plastics material containers, comprising at least one holding ring according to claim 4.

9. A holding ring according to claim 1, wherein an inclination of an inner face of the receiving cavity with respect to the longitudinal direction (L) amounts to at least 1° and at most 6°.

10. A holding ring according to claim 1, wherein an inclination of an inner face of the receiving cavity with respect to the longitudinal direction (L) amounts to between 1° and 3°.

11. A holding ring according to claim 1, wherein a projection of an extension of an inner face of the receiving cavity on the longitudinal direction (L) amounts to at most 8 mm.

12. A holding ring according to claim 1, wherein a projection of an extension of an inner face of the receiving cavity on the longitudinal direction (L) amounts to at most 6 mm.

13. A blow mould for the production of plastics material containers, comprising at least one holding ring according to claim 9.

14. A blow mould for the production of plastics material containers, comprising at least one holding ring according to claim 10.

15. A holding ring according to claim 1, wherein the support face widens radially outwards throughout in the manner of a cone.

16. A holding ring according to claim 1, wherein the support face is formed as an imaginary frustum with a cross-section widening towards the outside.

* * * * *